(12) United States Patent
Kunow et al.

(10) Patent No.: US 8,106,536 B2
(45) Date of Patent: Jan. 31, 2012

(54) UNIVERSAL POWER SUPPLY SYSTEM

(75) Inventors: Peter Kunow, Berlin (DE); Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 1199 days.

(21) Appl. No.: 10/489,573

(22) PCT Filed: Sep. 18, 2002

(86) PCT No.: PCT/EP02/10471
§ 371 (c)(1),
(2), (4) Date: Aug. 5, 2004

(87) PCT Pub. No.: WO03/026112
PCT Pub. Date: Mar. 27, 2003

(65) Prior Publication Data
US 2005/0013148 A1    Jan. 20, 2005

(30) Foreign Application Priority Data
Sep. 19, 2001    (DE) .............................. 201 15 471 U

(51) Int. Cl.
*H02J 3/00* (2006.01)
(52) U.S. Cl. .......................................... 307/82; 340/850
(58) Field of Classification Search ............... 307/82; 340/850
See application file for complete search history.

(56) References Cited

U.S. PATENT DOCUMENTS

| | | |
|---|---|---|
| 1,979,425 A | 11/1934 | Van Der Woude |
| 2,387,800 A | 10/1945 | Leland et al. |
| 3,275,737 A | 9/1966 | Caller |
| 3,324,741 A | 6/1967 | Anderson |
| 3,353,594 A | 11/1967 | Lewis |
| 3,887,898 A | 6/1975 | Jones |
| 3,980,808 A | 9/1976 | Kikuchi et al. |
| 4,062,057 A | 12/1977 | Perkins et al. |

(Continued)

FOREIGN PATENT DOCUMENTS
DE    145 982    1/1981
(Continued)

OTHER PUBLICATIONS

International Search Report for Appln. No. PCT/EP02/10471 dated Jul. 14, 2003 (pp. 12).

(Continued)

*Primary Examiner* — Rexford Barnie
*Assistant Examiner* — Hal Kaplan
(74) *Attorney, Agent, or Firm* — Conley Rose, P.C.

(57) ABSTRACT

A universal power supply system is used for at least one electric consumer. The supply system comprises at least one AC source and a cable connection connecting said AC source to said electric consumer. The AC source has associated therewith an AC/DC converter for converting the AC voltage into DC voltage. The DC voltage generated in this way is adapted to be transmitted to the electric consumer via the cable connection. To improve such a universal power supply in such a way that it is possible to provide a high and stable voltage, even in the case of high power requirements in a reliable manner and at a reasonable price, without any additional components for e.g, heat dissipation being necessary, the AC/DC converter comprises as plurality of AC/DC converter components which, on the input side thereof, are connected in parallel with the AC source and which, on the output side thereof are connected serially to the electric consumer.

18 Claims, 2 Drawing Sheets

U.S. PATENT DOCUMENTS

Figure 1:
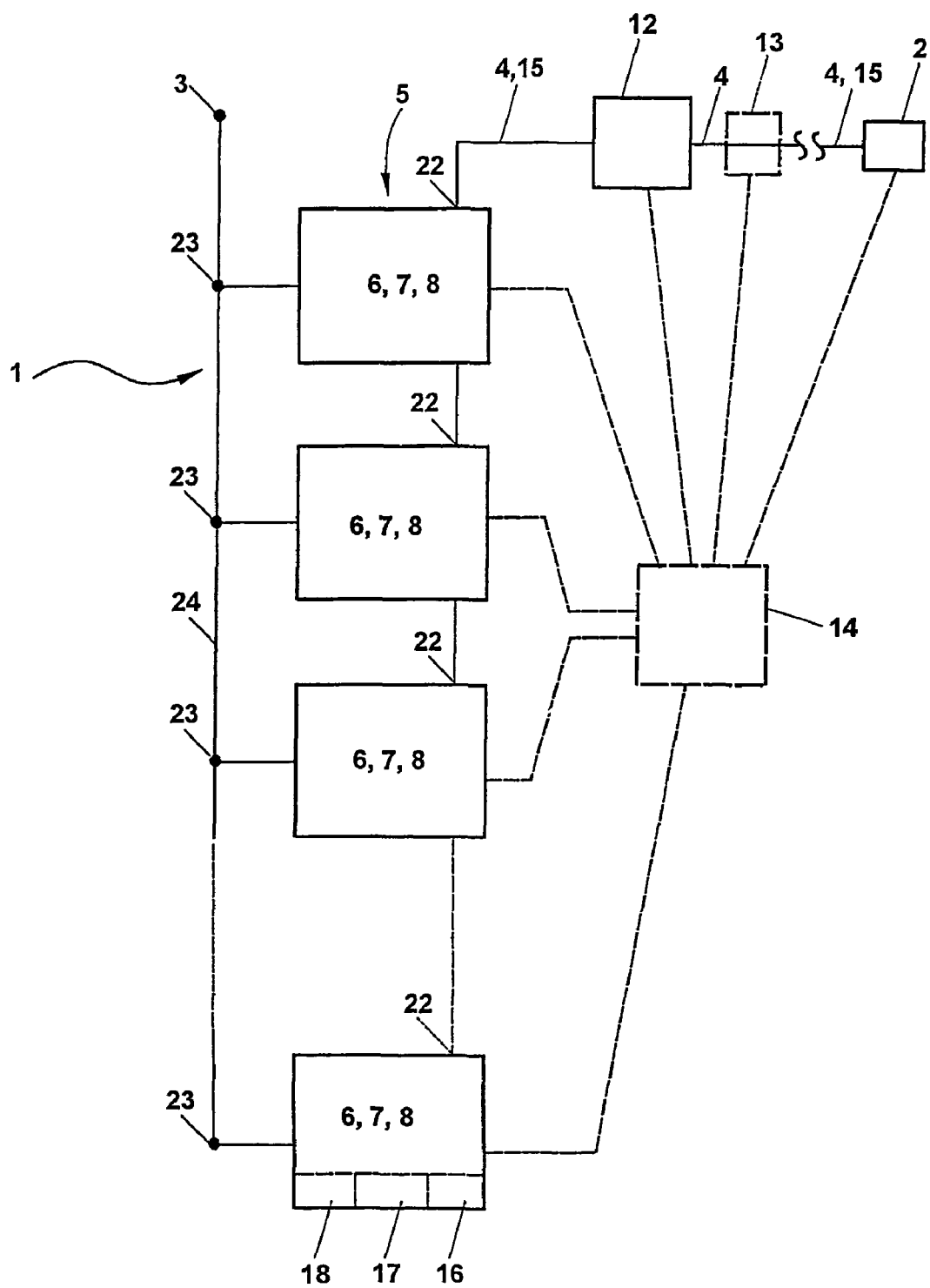

| Patent No. | | Date | Inventor |
|---|---|---|---|
| 4,124,884 | A | 11/1978 | Episcopo |
| 4,290,101 | A | 9/1981 | Hergenhan |
| 4,363,975 | A | 12/1982 | Beattie |
| 4,423,747 | A | 1/1984 | Heiser et al. |
| 4,500,832 | A | 2/1985 | Mickiewicz |
| 4,521,642 | A | 6/1985 | Vives |
| 4,533,987 | A | 8/1985 | Tomofuji et al. |
| 4,548,383 | A | 10/1985 | Wölfges |
| 4,617,501 | A | 10/1986 | Smith |
| 4,639,714 | A | 1/1987 | Crowe |
| 4,745,815 | A | 5/1988 | Klopfenstein |
| 4,771,982 | A | 9/1988 | Bodine et al. |
| 4,788,448 | A | 11/1988 | Crowe |
| 4,814,963 | A | 3/1989 | Petersen |
| 4,814,965 | A | 3/1989 | Petersen |
| 4,920,811 | A | 5/1990 | Hopper |
| 5,031,088 | A | 7/1991 | Tanaka |
| 5,055,991 | A | 10/1991 | Carroll et al. |
| 5,105,351 | A | 4/1992 | Harada et al. |
| 5,138,249 | A | 8/1992 | Capel |
| 5,168,422 | A | 12/1992 | Duncan |
| 5,195,721 | A | 3/1993 | Akkerman |
| 5,210,519 | A | 5/1993 | Moore |
| 5,230,033 | A | 7/1993 | Soodak |
| 5,285,563 | A | 2/1994 | Nove et al. |
| 5,297,015 | A | 3/1994 | Miyazaki et al. |
| 5,301,096 | A | 4/1994 | Klontz et al. |
| 5,311,419 | A | 5/1994 | Shires |
| 5,418,707 | A | 5/1995 | Shimer et al. |
| 5,489,897 | A | 2/1996 | Inoue |
| 5,508,903 | A | 4/1996 | Alexandrov |
| 5,563,780 | A | 10/1996 | Goad |
| 5,572,182 | A | 11/1996 | De Pinho Filho et al. |
| 5,573,032 | A | 11/1996 | Lenz et al. |
| 5,610,452 | A | 3/1997 | Shimer et al. |
| 5,629,844 | A | 5/1997 | Krichtafovitch et al. |
| 5,682,303 | A * | 10/1997 | Goad ........................... 363/71 |
| 5,731,969 | A | 3/1998 | Small |
| 5,754,028 | A | 5/1998 | Vezzini |
| 5,825,638 | A | 10/1998 | Shutts |
| 5,832,996 | A | 11/1998 | Carmody et al. |
| 5,923,550 | A | 7/1999 | Kumar |
| 5,930,340 | A | 7/1999 | Bell |
| 5,982,645 | A | 11/1999 | Levran et al. |
| 5,983,743 | A | 11/1999 | McGregor et al. |
| 5,984,260 | A | 11/1999 | Rawson et al. |
| 6,032,924 | A | 3/2000 | Castle |
| 6,041,667 | A | 3/2000 | Pischinger et al. |
| 6,073,907 | A | 6/2000 | Schreiner, Jr. et al. |
| 6,094,366 | A | 7/2000 | Kalfhaus |
| 6,095,487 | A | 8/2000 | Waber |
| 6,152,167 | A | 11/2000 | Baker |
| 6,154,381 | A | 11/2000 | Kajouke et al. |
| 6,158,295 | A | 12/2000 | Nielsen |
| 6,181,576 | B1 | 1/2001 | Ikeda et al. |
| 6,269,015 | B1 | 7/2001 | Ikeda et al. |
| 6,356,384 | B1 | 3/2002 | Islam |
| 6,385,057 | B1 | 5/2002 | Barron |
| 6,388,904 | B2 | 5/2002 | Nomura |
| 6,411,527 | B1 | 6/2002 | Reinold |
| 6,446,519 | B1 | 9/2002 | Biester |
| 6,494,257 | B2 | 12/2002 | Bartlett et al. |
| 6,559,385 | B1 | 5/2003 | Johnson et al. |
| 6,595,487 | B2 * | 7/2003 | Johansen et al. ......... 251/129.04 |
| 6,615,916 | B1 | 9/2003 | Vachon |
| 6,668,639 | B2 | 12/2003 | Fong et al. |
| 6,965,302 | B2 * | 11/2005 | Mollenkopf et al. ......... 370/475 |
| 6,998,962 | B2 | 2/2006 | Cope et al. |
| 7,075,414 | B2 | 7/2006 | Giannini et al. |
| 7,264,057 | B2 | 9/2007 | Rytlewski et al. |
| 2001/0012207 | A1 | 8/2001 | Nomura |
| 2005/0013148 | A1 | 1/2005 | Kunow et al. |
| 2005/0029476 | A1 | 2/2005 | Biester et al. |

FOREIGN PATENT DOCUMENTS

| | | |
|---|---|---|
| DE | 3224041 | 3/1983 |
| DE | 33 03 248 | 8/1984 |
| DE | 33 16 258 | 11/1984 |
| DE | 34 17 455 | 11/1985 |
| DE | 34 24 041 | 1/1986 |
| DE | 38 32 304 | 3/1990 |
| DE | 43 44 709 | 6/1993 |
| DE | 1 199 088 | 8/1995 |
| DE | 44 14 677 | 11/1995 |
| DE | 196 14 627 | 10/1997 |
| DE | 197 14 552 | 10/1998 |
| DE | 197 50 041 | 1/1999 |
| DE | 199 09 712 | 7/2000 |
| DE | 199 63 105 | 6/2001 |
| EP | 0 028 296 | 5/1981 |
| EP | 0 303 801 | 6/1986 |
| EP | 0 626 670 | 11/1994 |
| EP | 0 384 607 | 6/1995 |
| EP | 1 024 422 | 8/2000 |
| EP | 1 107 437 | 6/2001 |
| EP | 1 244 203 | 12/2001 |
| FR | 1 390 757 | 1/1965 |
| FR | 74 28273 | 11/1976 |
| FR | 2 353 992 | 12/1977 |
| GB | 1001629 | 8/1965 |
| GB | 2 141 882 | 1/1985 |
| GB | 2332220 | 6/1989 |
| GB | 2 266 942 | 11/1993 |
| JP | 59 103570 | 6/1984 |
| JP | 61 076071 | 4/1986 |
| JP | 61 240858 | 3/1987 |
| JP | 62 217857 | 9/1987 |
| JP | 63 308420 | 12/1988 |
| JP | 01 114368 | 5/1989 |
| JP | 02 206362 | 8/1990 |
| JP | 03 065054 | 3/1991 |
| JP | 03 150068 | 10/1991 |
| JP | 04 200270 | 7/1992 |
| JP | 05 327381 | 12/1993 |
| JP | 07 154967 | 6/1995 |
| JP | 08 338 391 | 12/1996 |
| SU | 1270293 | 11/1986 |
| SU | 1 709 511 | 1/1992 |
| WO | WO 95/20836 | 8/1995 |
| WO | WO 96/28878 | 9/1996 |
| WO | WO 97/38479 | 10/1997 |
| WO | WO 98/30816 | 7/1998 |
| WO | WO 99/37009 | 7/1999 |
| WO | WO 01/37411 | 5/2001 |
| WO | WO 01/52397 | 7/2001 |
| WO | WO 01/84689 | 8/2001 |

OTHER PUBLICATIONS

Partial International Search Report for Appln. No. PCT/EP02/10468 dated Jan. 16, 2003 (pp. 8).

International Search Report for Appln. No. PCT/EP02/10469 dated Oct. 23, 2003 (pp. 14).

Partial International Search Report for Appln No. PCT/EP02/10469 dated May 16, 2003 (pp. 7).

German Search Report for Appln. No. 200 18 560.8; Dated Oct. 23, 2001 (pp. 4).

German Search Report for Appln. No. 200 18 562.4; Dated Jul. 11, 2001 (pp. 4).

International Search Report for Appln. No. PCT/EP/12548 dated May 17, 2002 (pp. 2).

International Search Report for Appln. No. PCT/EP01/12550 dated Feb. 26, 2002 (pp. 6).

International Search Report for Appln. No. PCT/EP01/09513 dated Mar. 6, 2002 (pp. 7).

Chr. Rohrbach: *Handbuch für elektrisches Messen mechanischer Grössen*: 1967, Vdl—Verlag, Dusseldorf (DE) XP002156890 (pp. 448-449).

Engels, Ludwig, u.a.: *Informationsübertragung, Prozeßankopplung und und Komponenten eines Doppelrechnersystems*. In: etz-a, Bd. 98, 1977: (pp. 602-606).

Brusewitz, M.: Elektrochemische Aktoren; F&M Feinwerktechnik Mikrotechnik Mikroelektronik; vol. 106, No. 7/8; Jul. 1998 (pp. 527-530).

J. R. Pinheiro et al; *Isolated Interleaved-Phase-Shift-PWM de-dc ZVS Converters*: IEEE 2000; (pp. 2383-2388).

René Torrico-Bascope et al; *Dual-Bridge DC-DC Converter with Soft Switching Features*: IEEE 2001; (pp. 722-727).

Demercil S. Oliveira et al; *A Lossless Commutation PWM Two Level Forward Converter Operating Like a Full-Bridge*; IEEE 2000 (pp. 334-338).

Demercil S. Oliveira et al; *A Lossless Commutation PWM Two Level Forward Converter*; IEEE 2000 (pp. 582-588).

J. E. Baggio et al; *An Improved Full-Load-Range Isolated ZVS-PWM DC-DC Converter*; IEEE 2001 (pp. 708-714).

British Combined Search and Examination Report for Appln. No. GB0603306.2 dated Mar. 14, 2006 (pp. 5).

British Combined Search and Examination Report for Appln. No. GB0603307.0 dated Mar. 14, 2006 (pp. 6).

British Combined Search and Examination Report for Appln. No. GB0603309.6 dated Mar. 14, 2006 (pp. 6).

International Search Report for Appl. No. PCT/US05-14593 dated Sep. 29, 2006; (6 p.).

Office Action dated Nov. 17, 2005 for U.S. Appl. No. 10/415,510 (19 p.).

Office Action dated May 16, 2006 for U.S. Appl. No. 10/415,510 (19 p.).

Office Action dated Aug. 14, 2006 for U.S. Appl. No. 10/415,510 (22 p.).

Office Action dated Jan. 31, 2007 for U.S. Appl. No. 10/415,510 (21 p.).

Office Action dated Aug. 30, 2006 for U.S. Appl. No. 10/836,559 (15 p.).

Office Action dated Feb. 23, 2007 for U.S. Appl. No. 10/836,559 (20 p.).

Office Action dated Dec. 8, 2005 for U.S. Appl. No. 10/489,533 (20 p.).

Final Office Action dated Jul. 28, 2006 for U.S. Appl. No. 10/489,533 (19 p.).

Office Action dated May 18, 2007 for U.S. Appl. No. 10/489,533 (15 p.).

Office Action dated Dec. 19, 2006 for U.S. Appl. No. 10/489,533 (16 p.).

Office Action dated Jul. 3, 2006 for U.S. Appl. No. 10/489,583 (17 p.).

Office Action dated Jun. 4, 2007 for U.S. Appl. No. 10/489,583 (17 p.).

Office Action dated Dec. 15, 2006 for U.S. Appl. No. 10/489,583 (21 p.).

Office Action dated Jul. 17, 2006 for U.S. Appl. No. 10/489,584 (17 p.).

Office Action dated Jun. 15, 2007 for U.S. Appl. No. 10/489,584 (12 p.).

International Search Report for Appln. No. PCT/EP02/10467 dated Sep. 29, 2003 (pp. 8).

Office Action Dated Oct. 9, 2007 for U.S. Appl. No. 10/415,510; (24 p.).

Office Action Dated Oct. 18, 2007 for U.S. Appl. No. 10/489,533; (15 p.).

Office Action Dated Nov. 13, 2007 for U.S. Appl. No. 10/489,583 (16 p.).

Translation of Official Action dated Jan. 17, 2007 for Norwegian Appl. No. 20031892 (3 p.).

Response to Office Action Dated Nov. 17, 2005 for U.S. Appl. No. 10/415,510 (pp. 34).

Response to Final Office Action Dated May 16, 2006 for U.S. Appl. No. 10/415,510 (pp. 22).

Response to Office Action Dated Aug. 14, 2006 for U.S. Appl. No. 10/415,510 (pp. 15).

Response to Office Action Dated Jan. 31, 2007 for U.S. Appl. No. 10/415,510 (pp. 16).

Response to Office Action Dated Oct. 9, 2007 for U.S. Appl. No. 10/415,510 (pp. 24).

Office Action Dated Jun. 20, 2008 for U.S. Appl. No. 10/415,510 (pp. 24).

Response to Office Action Dated Aug. 30, 2006 for U.S. Appl. No. 10/836,559 (pp. 24).

Response to Office Action Dated Feb. 23, 2007 for U.S. Appl. No. 10/836,559 (pp. 15 ).

Request for Continued Examination (RCE) and Response to Final Office Action for U.S. Appl. No. 10/836,559 Dated Aug. 9, 2007 (pp. 13).

Office Action Dated Feb. 21, 2008 for U.S. Appl. No. 10/836,559 (pp. 17).

Response to Office Action Dated Feb. 21, 2008 for U.S. Appl. No. 10/836,559 (pp. 12).

Office Action Dated Aug. 15, 2008 for U.S. Appl. No. 10/836,559 (pp. 17).

Response to Office Action Dated Dec. 8, 2005 for U.S. Appl. No. 10/489,533 (23 p.).

Response to Final Office Action Dated Jul. 28, 2006 for U.S. Appl. No. 10/489,533 (pp. 14).

Response to Office Action Dated Dec. 19, 2006 for U.S. Appl. No. 10/489,533 (pp. 12).

Request for Continued Examination, Amendment, and Response to Final Office Action for U.S. Appl. No. 10/489,533 Dated May 18, 2007 for U.S. Appl. No. 10/489,533 (pp. 13).

Response to Office Action Dated Oct. 18, 2007 for U.S. Appl. No. 10/489,533 (pp. 11).

Office Action Dated Apr. 7, 2008 for U.S. Appl. No. 10/489,533 (pp. 18).

Response to Office Action Dated Apr. 7, 2008 for U.S. Appl. No. 10/489,533 (pp. 10).

Response to Office Action Dated Jul. 3, 2006 for U.S. Appl. No. 10/489,583 (pp. 9).

Response to Office Action Dated Jun. 4, 2007 for U.S. Appl. No. 10/489,583 (pp. 10).

Response to Office Action Dated Dec. 15, 2006 for U.S. Appl. No. 10/489,583 (pp. 10).

Response to Office Action Dated Jul. 17, 2006 for U.S. Appl. No. 10/489,584 (pp. 17).

Notice of Allowance and Fee(s) Due for U.S. Appl. No. 10/489,584 Dated May 29, 2008 (pp. 13).

Supplemental Notice of Allowability for U.S. Appl. No. 10/489,584 Dated Aug. 27, 2008 (pp. 8).

Notice of Allowance and Fee(s) Due Dated Jul. 16, 2008 for U.S. Appl. No. 10/489,583 (pp. 7).

Supplemental Notice of Allowability for U.S. Appl. No. 10/489,583 Dated Aug. 4, 2008 (pp. 5).

Translation of Norwegian Official Action Dated Dec. 7, 2007 for Appl. No. 2004 1129 (pp. 6).

Translation of Norwegian Official Action Dated Jan. 30, 2008 for Appl. No. 2004 1130 (pp. 7).

Translation of Norwegian Official Action Dated Dec. 7, 2008 for Appl. No. 2004 1128 (pp. 3).

Translation of Norwegian Official Action Dated Feb. 5, 2008 for Appl. No. 2004 1134 (pp. 3).

Response to Office Action Dated Jun. 20, 2008 for U.S. Appl. No. 10/415,510 (18 pp.).

Final Office Action Dated Jan. 7, 2009 for U.S. Appl. No. 10/415,510 (26 pp.).

Response to Final Office Action Dated Jan. 7, 2009 for U.S. Appl. No. 10/415,510 (18 pp.).

Response to Office Action dated Aug. 15, 2008 for U.S. Appl. No. 10/836,559 (21 pp.).

Final Office Action Dated Feb. 19, 2009 for U.S. Appl. No. 10/836,559 (18 pp.).

Final Office Action Dated Dec. 12, 2008 for U.S. Appl. No. 10/489,533 (18 pp.).

Response to Final Office Action Dated Dec. 12, 2008 for U.S. Appl. No. 10/489,533 (11 pp.).

Translation of Norwegian Official Action dated Nov. 5, 2008 for Appl. No. 2004 1130 (6 pp.).

Translation of Norwegian Official Action dated Jan. 6, 2009 for Appl. No. 2004 1134 (4 pp.).

Norwegian Office Action Dated Dec. 5, 2008 for Appl. No. 01 980 532.4-2207 (3 pp.).

\* cited by examiner

UNIVERSAL POWER SUPPLY SYSTEM

CROSS REFERENCE TO RELATED APPLICATIONS

The present application claims priority to PCT/EP02/10471 filed 18 Sep. 2002 and to German Application No. 201 15 471.4 filed 19 Sep. 2001 both of which are incorporated herein by reference and is further related to U.S. application Ser. No. 10/415,510; U.S. application Ser. No. 10/836,559 filed Apr. 30, 2004; U.S. application Ser. No. 10/489,533 filed Aug. 5, 2004; U.S. application Ser. No. 10/489,583 filed Aug. 5, 2004; and U.S. application Ser. No. 10/489,584 filed Aug. 5, 2004.

The present invention relates to a universal power supply system for at least one electric consumer. The power supply system comprises at least one AC source and a cable connection connecting said AC source to said electric consumer. The AC source has associated therewith an AC/DC converter for converting the AC voltage into a DC voltage. The DC voltage generated in this way is adapted to be transmitted to the electric consumer via the cable connection.

In the case of electric consumers necessitating a high voltage and a high power, it turned out that the use of such a universal power supply system entails difficulties with respect to the generation and the stabilization of the voltage. In addition, if the AC/DC converter fails to operate, a supply of the electric consumer is no longer possible, since a redundancy with respect to the converter is normally dispensed with for reasons of costs.

Furthermore, when AC voltage is converted into DC voltage by means of such an AC/DC converter, the generation of a substantial amount of heat within comparatively close limits will have to be reckoned with due to losses of the converter. This heat must be dissipated so as to prevent damage being caused to the converter or to other components of the power supply system which are located adjacent said converter. The heat can be dissipated e.g. by active cooling systems, but this will entail additional structural components and costs.

It is therefore the object of the present invention to improve a universal power supply system of the type mentioned at the start in such a way that it is possible to provide a high and stable voltage, even in the case of high power requirements, in a reliable manner and at a reasonable price, without any additional components for e.g. heat dissipation being necessary.

In connection with the features of the generic clause of claim 1, this object is achieved in that the AC/DC converter comprises a plurality of AC/DC converter components which, on the input side thereof, are connected in parallel with the AC source and which, on the output side thereof, are connected serially to the electric consumer.

Due to this mode of connection of the AC/DC converter components, each of these components only serves to generate a certain percentage of the voltage on the consumer or output side of the AC/DC converter. If the DC voltage which is to be produced on the output side amounts e.g. to 6000 V, said DC voltage can be produced by e.g. 20 converter components having each an output voltage of 300 V. It is also possible to provide 30, 40 or 50 converter components, each of these converter components providing then a respective percentage of the DC voltage required on the output side.

In the simplest case, the converter components all have the same type of structural design so that, in the case of n converter components, each converter component produces the $n^{th}$ percentage of the necessary output voltage from the AC voltage applied to the input side.

In contrast to an AC/DC converter for producing e.g. 6000 V, such converter components are easy to handle and easy to maintain. The dissipation heat per converter component is here normally so low that separate cooling means can be dispensed with. If the converter components are arranged comparatively close to one another, simple cooling means conducting e.g. cooling air over the converter components will suffice even in the case of high power. In comparison with known converters, the costs for cooling this AC/DC converter are, however, reduced substantially.

If one of the converter components fails to operate, the output voltage will only be reduced by said $n^{th}$ part so that also the remaining n−1 converter components will still provide a sufficiently high voltage for the electric consumer. Only if a plurality of converter components fails to operate, it may prove to be necessary to replace said converter components, at least partially. In any case, if one or a plurality of converter components fails to operate, it is still guaranteed that the voltage supplied to the electric consumer will still be sufficiently high to permit operation thereof (redundancy).

A simple and reliable AC source can be seen in an embodiment in which said AC source is a 380 V three-phase power source.

A converter component of the type mentioned at the beginning can be defined e.g. by a linearly controlled converter component. Such converter components have, however, a comparatively low efficiency which is in most cases as low as 25 to 50%. It follows that, in the case of high power values in the kilowatt range, the dissipation power will normally at least correspond to the power delivered. This results not only in high energy losses but also in a cooling problem, even if a plurality of converter components is provided.

The dissipation power of the converter components can easily be reduced by implementing said converter components as switched mode (mains) power supplies. Such a switched mode power supply is provided with a switch causing said converter component to be connected to and separated from the mains e.g. in accordance with the mains voltage of 50 Hz.

The losses can be reduced still further when the switched mode power supply is clocked independently of the mains frequency of e.g. 50 Hz. Clock pulse control at higher frequencies is preferred in this connection.

Various realizations of such a clocked switched mode power supply are known. The first subdivision that can be carried out is a division into switched mode mains power supplies clocked on the secondary side and those clocked on the primary side. In both said fundamental versions, it is possible that a current flows constantly into a storage capacitor of the switched mode mains power supply or that a current is only discharged at certain time instances so that the converter in question is referred to as a feed forward converter or a flyback converter. In order to obtain a compact and reliable component, the switched mode mains power supply according to the present invention can, for example, be implemented as a flyback converter. This flyback converter can preferably be clocked on the primary side so as to obtain a galvanic separation between the input and output sides, and it can be a single-phase or a push-pull converter. Single-phase converters are, in this context, advantageous insofar as they normally require only one power switch as a clock switching means. This power switch can be implemented e.g. as a power MOSFET or as a BIMOSFET. In addition, also thyristors may be used as clocked switching means especially when high power values in the kilowatt range are involved.

The above-mentioned switched mode mains power supplies have, especially in the case of higher power values, a plurality of advantages, such as a lower dissipation power, a lower weight, a smaller volume, no generation of noise, less smoothing outlay and a larger input voltage range. Switched mode mains power supplies and especially also flyback converters are used in a great variety of fields of application, such as microwave ovens, computers, electronic adapting equipment for fluorescent lamps, industrial and entertainment electronics, screens, cardiac defibrillators and the like. Flyback converters are also excellently suitable for use in fields of application where a high power is required on the output side.

A pulse width modulation means, in particular a pulse width modulation means which is adapted to be controlled or regulated, can be provided for activating the switching means of the flyback converter or of the switched mode mains power supply in a suitable manner. This pulse width modulation means is capable of producing a series of pulses which are adapted to be varied with respect to their width and/or height and/or frequency. A frequently used pulse modulation means is a pulse width modulation means. This pulse width modulation means produces a pulse width-modulated signal whose clock cycle ratio can be controlled in accordance with a measured actual value of the output voltage. The measured actual value of the output voltage can e.g. be subtracted from the desired value and this difference can be supplied via a control amplifier to the pulse width modulation means. Here, the output voltage of the control amplifier can be compared with a sawtooth voltage whose frequency determines the switching frequency or clocking of the switched mode mains power supply. Depending on the result of this comparison, the switching transistor is then switched on or off, whereby a desired output voltage can be adjusted.

In accordance with an advantageous embodiment, the maximum output voltage of the switched mode mains power supply is chosen such that it does not exceed a limit value below the breakdown voltage of a respective component of the switched mode mains power supply, especially of the switching means, so that a safety distance from the breakdown voltage is kept.

As has already been mentioned hereinbefore, the flyback converter belongs to the converters that are clocked on the primary side, i.e. it is galvanically separated between the input and the output.

In this connection, it may of advantage when the flyback converter provides a plurality of galvanically separated, controlled output voltages.

The clock frequency of the switching means can be in the kilohertz range and in particular in the hundred-kilohertz range so as to permit a sufficiently fast clocking of the switching means and, in this connection, a comparatively low dissipation power of the flyback converter. For example, flyback converters are known, which are clocked in the range of from 20 kHz to 200 kHz. Lower and higher clock frequencies are, however, possible as well.

In order to avoid, especially in the case of high power values, the necessity of providing separate cooling means for the converter components, said converter components can be arranged in spaced relationship with one another. The spatial distance is, however, so small that, normally, it corresponds only to the dimensions of one converter component.

A filter means can be arranged between the AC/DC converter and the electric consumer so that, if necessary, the DC voltage generated by the AC/DC converter can be smoothed still further.

In the case of certain electric consumers, it may prove to be advantageous when also a signal connection is provided in addition to a voltage supply. In order to avoid the necessity of providing an additional cable connection to the electric consumer for this purpose, a means for coupling data signals in/out can be connected to the cable connection, said means for coupling data signals in/out being especially located between the filter means and the electric consumer. This means for coupling data signals in/out can, on the one hand, be used for coupling respective data signals into the data connection for e.g. controlling the electric consumer or for supplying information thereto. In the opposite direction, data received from the electric consumer can be coupled out from the cable connection and used e.g. for monitoring the electric consumer by means of suitable units, such as computers and the like.

In this connection, it must betaken into account that data transmission on the basis of the output-side DC voltage can be effected with less interference and with a higher velocity than in cases in which the electric consumer is supplied with an AC voltage.

At least the AC source and/or the AC/DC converter and/or the means for coupling data signals in/out may have associated therewith a controller so that the various units of the power supply system according to the present invention can be monitored, controlled or, if necessary, regulated more effectively. This controller can e.g. also detect whether one of the converter components implemented as a flyback converter has failed. If such failure is detected, the other flyback converters can be activated such that they compensate for the failure of said one flyback converter in that a slightly higher output voltage is e.g. delivered by each of the other flyback converters.

The controller can also control the pulse width modulation means in this connection.

The controller can not only by used for monitoring purposes alone, but it is also possible to use it for establishing a communication connection between the respective units of the power supply system. This will be of advantage especially in cases in which the various units are arranged at comparatively large distances from one another and/or at inaccessible sites. With the aid of this communication connection, physical examination or maintenance can be limited to rare cases or to cases where the unit in question has to be replaced.

The cable connection may comprise at least one coaxial cable so that, even if high power is to be transmitted and if voltage and data are transmitted simultaneously, said cable connection can be established such that it has a small cross-section, whereby costs will be saved, especially in the case of long distances. Since the voltage transmitted through the coaxial cable is a DC voltage, only line losses will occur, whereas additional attenuation losses, which are caused by a transmission of AC voltages, are avoided.

In connection with the converter components and especially the flyback converters used as such components, attention should also be paid to the fact that each of each of said converter components should be adapted to be controlled or regulated separately with respect to its output voltage. The inputs of the converter components are arranged in parallel in each converter component so that the voltage supply and, consequently, current and power are fully separated. It follows that, irrespectively of the output voltage, also the total power of the system can be adapted according to requirements. A completely free selection of the power and of the output voltage is therefore possible. Due to the use of a plurality of converter components, an extremely exact and precise control of the output voltage as well as of the power are additionally obtained, since each converter component controls independently of the other components only its own range.

If one of the converter components fails to operate, the power supply is still guaranteed (redundancy), since the other converter components are activated in a suitable manner so that the power failure of the converter component that failed to operate will be compensated for on the output side. The respective range within which each of the still operative converter components has to be adjusted is extremely small, since a comparatively low increase in the voltage on the output side of the plurality of converter components will already lead to a substantially higher increase in the total output voltage.

In connection with each converter component and especially in connection with the flyback converter it is possible to dispense with additional components, i.e. to implement said converter components e.g. as integrated circuits comprising in addition to the actual flyback converter other elements, such as a power factor control means, an undervoltage detection means, an overvoltage monitoring means, a so-called "soft start" and the like.

It should also be pointed out that, due to the DC voltage transmitted on the output side to the electric consumer, thin line cross-sections are possible especially when a coaxial cable is used as a cable connection; these thin line cross-sections permit a substantial reduction of the cable connection costs. In particular when the distances to the electric consumer are in the kilometer range and when the distances amount to 50 kilometers and more, substantial amount of costs will be saved, although the coaxial cable can simultaneously be used for transmitting data as well.

Expensive capacitors, such as electrolytic filter capacitors, are no longer necessary for smoothing the DC voltage on the output side. In addition, power factor correction can take place directly in the flyback converter; a suitable means for effecting this correction can be included in the flyback converter or rather in the integrated circuit thereof. The high clock frequency of the flyback converter simultaneously guarantees that the AC voltage on the input side is sampled in full width, whereby a high efficiency is obtained.

Figure 2:
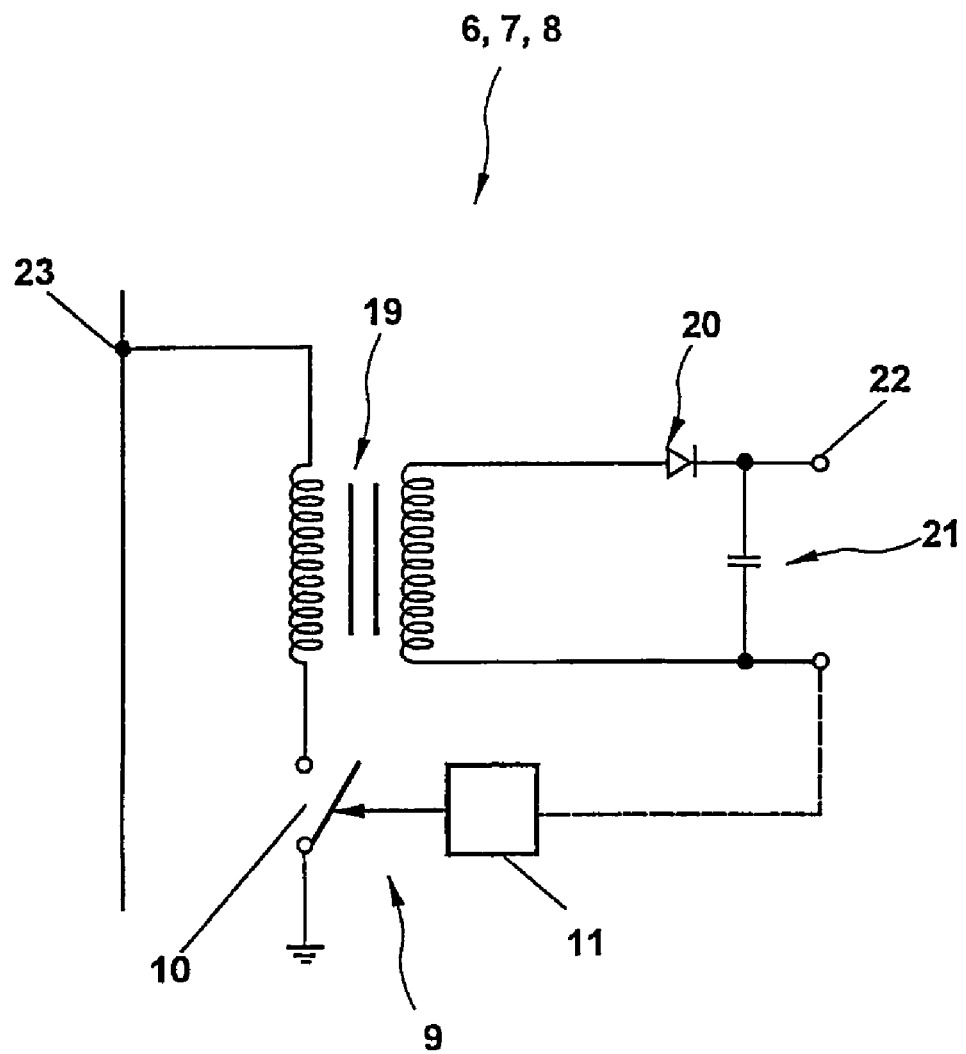

In the following, an advantageous embodiment of the present invention will be explained making reference to the figures added as drawings, in which:

FIG. 1 shows a schematic representation of an embodiment of the universal power supply system, and FIG. 2 shows a schematic circuit diagram of an embodiment of a flyback converter docked on the primary side and used as a converter component.

FIG. 1 shows a schematic circuit diagram of an embodiment of the universal power supply system 1 according to the present invention. This universal power supply system comprises a 380 V three-phase AC power source 3. The AC voltage is adapted to be transmitted to an AC/DC converter 5 via a line 24. This AC/DC converter 5 is composed of a plurality of AC/DC converter components 6 which are connected in parallel to the line 24 via respective input terminals 23.

The AC/DC converter components 6 are defined by a switched mode power supply 7 and, in particular, by a flyback converter 8 clocked on the primary side and acting as a switched mode power supply 7.

On the output side, the various converter components 6 are serially connected to one another via respective output terminals 22 and they are connected to a coaxial cable 15 acting as a cable connection 4. Via said cable connection 4, an electric consumer 2 has electric power supplied thereto. Between the AC/DC converter 5 and the electric consumer 2, a means for coupling data signals in/out 13 is additionally connected to the cable connection 4. Said means for coupling data signals in/out 13 is used for feeding in respective data signals or for coupling out data signals that have been received from the electric consumer 2 or from units associated therewith. The transmission of the data signals is also effected via the cable connection 4 implemented as a coaxial cable 15.

In FIG. 1, only one electric consumer 2 is shown. Normally, a plurality of electric consumers has supplied thereto electric power and also data via the cable connection 4 from the universal power supply system 1 according to the present invention. Such electric consumers are e.g. actuators located at sites which are far away and/or not easily accessible. The actuators control e.g. units of fluid lines, such as valves, shut-off devices, restrictors, pumps and the like, so that the flow of fluid into and along the fluid line is controlled and shut off in emergency cases, such as leakage, line fractures or the like, and so that also parameters of the fluid, of the fluid flow or of the respective units are monitored and controlled. The fluid is normally fed into the lines under high pressure from a respective fluid source and conducted along said lines e.g. from the bottom to the surface of the sea. Since such a fluid normally contains aggressive or environmentally noxious components, a power supply and remote control which can be effected with the aid of the universal power supply system 1 according to the present invention will be of great advantage.

The remote control of the respective actuators can in this connection be carried out via the communication connection established with the aid of the means for coupling data signals in/out 13.

All the units of the universal power supply system 1, including, if desired, the electric consumer 2, are adapted to be controlled and/or regulated by a controller 14. In addition, a relevant monitoring of parameters of the various units can be carried out. In FIG. 1, the controller 14 is connected to the various units via connections represented by broken lines, so as to control, regulate and/or monitor said units.

The switched mode power supplies 7 and flyback converters 8, respectively, can be implemented as integrated circuits. These integrated circuits directly comprise respective further units, such as power factor control means 16, undervoltage detection means 17 or over-voltage monitoring means 18. In order to simplify matters, these additional units are shown in FIG. 1 only in the case of one flyback converter 8; normally, they are, however, component parts of all flyback converters.

FIG. 2 shows a simplified embodiment for a flyback converter 8 acting as a switched mode power supply 7. The flyback converter 8 comprises a transmitter 19 consisting of a primary winding connected to the input terminal 23 and of a secondary winding connected to the output terminal 22. An effective magnetic coupling exists between these two windings. The transmitter acts as a magnetic energy storage. When a switching means 9 in the form of a power transistor 10 is closed, the current will increase in the primary winding and energy will be stored in the transmitter. When the switching means 9 is opened, the stored energy on the side of the secondary winding will be supplied to a smoothing capacitor 21 via a diode 20. The stored energy is fed in, in the form of an AC voltage, via the output terminal 22. The respective flyback converters have their output terminals 22 serially connected to the cable connection 4, cf. FIG. 1.

For activating or clocking the switching means 9, i.e. the power transistor 10, a pulse width modulation means 11 is provided in the flyback converter 8. Said pulse width modulation means 11 produces a pulse width-modulated signal whose clock cycle ratio is controlled in accordance with the measured actual value of the output voltage. For this purpose, the actual value measured at the output of the flyback converter is subtracted from the respective desired value and this difference is supplied, via a control amplifier of the flyback converter, to the pulse width modulation means 11. Here, the output voltage of the control amplifier is compared with a sawtooth voltage whose frequency determines the clock frequency of the flyback converter. Depending on the result of this comparison, the switching means 9 is switched on or off and the desired output voltage is adjusted in this way.

For controlling the flyback converter, there are integrated circuits, which can be associated with or included in each of the flyback converters 8 according to FIG. 1. These integrated circuits also comprise the protection circuits, e.g. undervoltage detection means, overcurrent monitoring means, soft starting means and the like, which are required for operating the flyback converter.

The invention claimed is:

1. A system for supplying power to an electrical device, the system comprising:
  an AC source;
  a plurality of AC/DC converters, wherein an input side of each AC/DC converter is connected to the AC source and wherein an output side of each AC/DC converter is connected to an electrical conductor that couples to the electrical device;
  each of the AC/DC converters comprising a switching mechanism that permits each AC/DC converter to be clocked independently of a frequency of the AC source;
  a single controller coupled to the AC/DC converters, wherein the controller is operable to regulate a function of each AC/DC converter;
  wherein the plurality of AC/DC converters are operable to supply a high DC voltage to the electrical device via the electrical conductor;
  wherein each of the AC/DC converter outputs is independently controlled by the controller such that the system lacks a master converter, the operation of which determines the operation of the other AC/DC converter switching mechanisms.

2. The system of claim 1 further comprising a data coupling device coupled to the electrical conductor, wherein the data coupling device is operable to send data to the electrical device and receive data from the electrical device via the electrical conductor while power is supplied to the electrical device via the electrical conductor.

3. The system of claim 2 wherein the data sent to the electrical device via the electrical conductor controls the electrical device.

4. The system of claim 2 wherein the data received from the electrical device is used to monitor the electrical device.

5. The system of claim 2 further comprising a filter coupled between the data coupling device and the electrical device.

6. The system of claim 1, wherein the controller is operable to regulate more than one function of each AC/DC converter.

7. The system of claim 6 wherein the controller is operable to detect failure of an AC/DC converter and cause functioning AC/DC converters to compensate for the failed AC/DC converter.

8. The system of claim 6 wherein the controller independently controls an output power of each AC/DC converter.

9. The system of claim 6 wherein the AC/DC converters are in a spaced relationship with each other such that heat from the AC/DC converters is dissipated without the need of a cooling mechanism.

10. The system of claim 1 wherein each AC/DC converter comprises a pulse width modulator coupled to the switching mechanism and wherein the controller controls the pulse width modulator such that the switching mechanism is clocked according to a pulse width modulated signal.

11. The system of claim 1 wherein the electrical device is an actuator.

12. The system of claim 1 wherein the electrical conductor is a coaxial cable.

13. The system of claim 12 wherein the electrical conductor is under water.

14. The system of claim 13 wherein the electrical conductor is more than one kilometer in length.

15. The system of claim 1 wherein the plurality of AC/DC converters are operable to supply a high DC voltage to the electrical device via the electrical conductor without a cooling mechanism that would otherwise be needed when less than the plurality of AC/DC converters are implemented to supply the high DC voltage to the electrical device.

16. A system for supplying power from a sea surface to a subsea location, the system comprising:
  an AC source for disposal at the sea surface;
  a subsea electrical device;
  a plurality of AC/DC converters for disposal at the sea surface, each having an input side connected to the AC source and an output side connected to an electrical conductor extending subsea to the subsea electrical device;
  each of the AC/DC converters comprising a switching mechanism that permits each AC/DC converter to be clocked independently of a frequency of the AC source;
  a single controller coupled to the AC/DC converters, wherein the controller is operable to regulate a function of each AC/DC converter;
  wherein the plurality of AC/DC converters are operable to supply a high DC voltage to the electrical device via the electrical conductor;
  wherein each of the AC/DC converter outputs is independently controlled by the controller such that the system lacks a master converter, the operation of which determines the operation of the other AC/DC converter switching mechanisms.

17. The system of claim 16 further comprising a data coupling device coupled to the electrical conductor to send and receive data to and from the subsea electrical device via the electrical conductor while power is being supplied to the subsea electrical device via the electrical conductor.

18. The system of claim 16 wherein the AC/DC converters are in a spaced relationship with each other such that heat from the AC/DC converters is dissipated without the need of a cooling component.

* * * * *